United States Patent [19]
Gilmore et al.

[11] Patent Number: 5,449,997
[45] Date of Patent: *Sep. 12, 1995

[54] BATTERY CHARGING SYSTEM HAVING LOGARITHMIC ANALOG-TO-DIGITAL CONVERTER WITH AUTOMATIC SCALING OF ANALOG SIGNAL

[75] Inventors: Alan A. Gilmore; Daniele C. Brotto, both of Baltimore, Md.

[73] Assignee: Black & Decker Inc., Newark, Del.

[ * ] Notice: The portion of the term of this patent subsequent to Oct. 4, 2011 has been disclaimed.

[21] Appl. No.: 186,011

[22] Filed: Jan. 24, 1994

Related U.S. Application Data

[62] Division of Ser. No. 707,712, May 30, 1991, Pat. No. 5,352,969.

[51] Int. Cl.$^6$ .......................... H01M 10/44; H02J 7/04
[52] U.S. Cl. .......................... 320/39; 320/20; 320/43
[58] Field of Search .......................... 320/20, 21, 39, 43

[56] References Cited

U.S. PATENT DOCUMENTS

| | | | |
|---|---|---|---|
| 3,794,905 | 2/1974 | Long | 320/20 |
| 4,227,141 | 10/1980 | Cross | 320/20 |
| 4,388,582 | 6/1983 | Saar et al. | 320/20 |
| 4,392,101 | 7/1983 | Saar et al. | 320/20 |
| 4,625,197 | 11/1986 | Holmes | 340/347 AD |
| 4,639,655 | 1/1987 | Westhaver et al. | 320/14 |
| 4,746,852 | 5/1988 | Martin | 320/20 |
| 4,746,854 | 5/1988 | Baker et al. | 320/40 |
| 4,755,735 | 7/1988 | Inakagata | 320/35 |
| 4,806,840 | 2/1989 | Alexander et al. | 320/20 |
| 4,961,043 | 10/1990 | Koenck | 320/21 |
| 4,998,057 | 3/1991 | Shinohara et al. | 320/40 |
| 5,268,630 | 12/1993 | Bhagwat et al. | 320/20 |
| 5,352,969 | 10/1994 | Gilmore et al. | 320/39 |

FOREIGN PATENT DOCUMENTS

0206503  12/1986  European Pat. Off. .
4110453  10/1991  Germany .

*Primary Examiner*—Peter S. Wong
*Assistant Examiner*—Adolf Berhane
*Attorney, Agent, or Firm*—Harness, Dickey & Pierce

[57] ABSTRACT

An ultra-quick charging device for charging battery packs for an assortment of different appliances, such as power tools, having a wide range of output voltages. The charging device includes an AC to DC high current power supply circuit and a microcomputer-based controller circuit for monitoring the voltage of the battery and converting from fast charge to trickle charge when the second inflection point in the battery voltage charge curve is detected. In order to permit the device to charge battery packs of different rated voltages, the device includes a logarithmic analog-to-digital converter circuit having a selectable prescaler circuit that attenuates the battery voltage signal. The microcomputer is programmed to automatically set the appropriate attenuation level of the prescaler circuit at the outset of the charging cycle by assuming that the maximum voltage of the battery pack being charged will be less than or equal to 150 percent of its observed battery voltage following the initial settling period of the charge cycle. In this manner the present invention is able to automatically fully charge battery packs ranging in voltage between 3 volts and 24 volts.

18 Claims, 2 Drawing Sheets

BATTERY CHARGING SYSTEM HAVING LOGARITHMIC ANALOG-TO-DIGITAL CONVERTER WITH AUTOMATIC SCALING OF ANALOG SIGNAL

This is a division of U.S. patent application Ser. No. 07/707,712, filed May 30, 1991 now U.S. Pat. No. 5,352,969.

BACKGROUND OF THE INVENTION

1. Field of the Invention

This invention relates generally to a battery charging system for rapidly charging batteries having different voltage ratings and, in particular, to a battery charging system incorporating a logarithmic analog-to-digital converter which provides automatic scaling of the battery voltage signal.

2. Background of the Art

Disposable batteries have a common and widespread use in our everyday lives. From battery-operated toys to battery-operated tools, batteries play an important role. However, batteries are not always reliable. Problems range from batteries which lose their power from inactivity to batteries which seem to lose their power at inopportune times from continued use. Therefore, it is generally desirable to keep fresh batteries on hand. With the number of different styles and voltage outputs of so many different batteries it is typically quite a task to keep the right batteries stored. In addition, batteries can be relatively expensive to purchase, and therefore are not always conveniently at hand. Moreover, there are a number of environmental concerns about disposing of batteries in landfills and the like due to the toxicity of many battery materials.

Because of at least these characteristics of disposable batteries, the popularity of rechargeable batteries is on the rise. For a rechargeable battery it is necessary that the battery or battery pack be periodically charged in order to ensure that they are maintained in a charged state. This generally alleviates the problem of having a dead battery at a time when its use is required. Another problem arises, however, in that a battery pack charger will generally require a relatively lengthy time to fully charge the batteries. It, therefore, has been known to maintain the battery in the charging mode during times of nonuse. However, this presents a further problem in that continued charging of an already charged battery pack leads to slow deterioration of the batteries.

To solve this problem, it is known in the art to have a fast charging system which will charge the battery pack in a relatively minimal amount of time so that the battery pack operator can charge the battery pack as it is needed. However, a number of problems arise even with this type of system. Since fast charging of a chargeable battery pack requires high current, it is extremely important to terminate the charging procedure before the battery pack is overcharged. In other words, the fast charging systems must have means for accurately indicating full battery charge. Charging beyond the full battery charge leads to battery deterioration and, over an extended number of overchargings, to battery pack failure.

A number of different systems are known in the art to detect full battery charge in a fast charging system. One method of determining full charge is by monitoring the temperature of the battery pack. These types of systems, however, suffer the drawbacks of repeated repetition of high temperature, low charging efficiency, and problems with safety in defective cells. A second type of fast charging system uses a voltage cutoff technique. These types of systems have proved to be unsatisfactory in that temperature variations lead to large voltage variations, and thus, an inaccurate full charge determination. Another type of fast charging system incorporates the termination of the charging as a function of the time of charging. These types of systems have been unreliable in that it is difficult to accurately tell what the state of the charge of the battery pack is at the initiation of the charging sequence.

A more reliable method of fast charging has been disclosed in which the charging device monitors the slope of the voltage-time curve for a particular battery. Since the voltage-time charging curve for a particular battery will always be substantially the same, it is possible to determine different points on the curve which represent different points in the charging sequence, and thus it is possible to determine which point of the curve represents full charge.

A quick charging system incorporating a type of slope monitoring technique is disclosed in U.S. Pat. Nos. 4,388,582 and 4,392,101 both to Saar et al. herein incorporated by reference and assigned to the same assignee as the present invention. The Saar et al. patents disclose a quick charging technique which analyzes the charging of a battery by noting inflection points which occur in the curve as the electrochemical potential within the battery changes with respect to time. By determining specific inflection points in the charging curve, it is possible to accurately terminate the rapid charging when the battery receives full charge.

Figure 1:
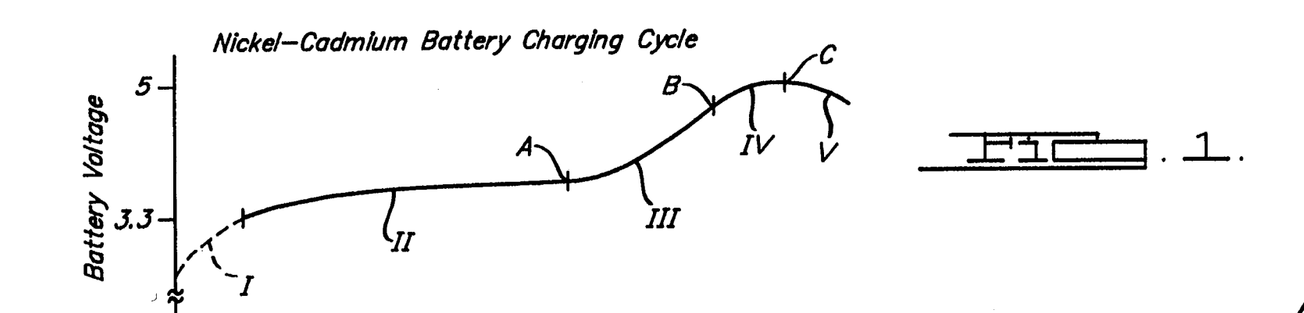
FIG. 1 is a graph showing battery voltage versus time for a charging sequence of a nickel-cadmium battery.

The inflection point type analysis can be illustrated by viewing FIG. 1. FIG. 1 is a typical voltage-time curve of a nickel-cadmium ("NiCad") battery. As is apparent, the voltage continuously rises as the charging time increases until it gets to a maximum charge point. Although the specific values of the curve may differ from battery to battery, the general shape of the curve is typical for all nickel-cadmium batteries. Further, every type of rechargeable battery will have a voltage-time curve indicative of its type.

As is apparent, the curve can be separated into five distinct regions. Region I represents the beginning of the charging sequence. In this region, the voltage characteristics are somewhat unreliable and may vary from battery to battery in accordance with its prior history of being charged and discharged. It is for this reason that region I is shown as a dotted line. Further, this region is not important in the charging sequence since it is generally traversed within a relatively short period of time after the start of the charging sequence.

After approximately 30–60 seconds of starting the charging sequence, the charging curve will enter the more stable region of region II. Region II is generally the longest region of the charging sequence, and is marked by most of the internal chemical conversion within the battery itself. As is apparent, the voltage of the battery does not increase substantially over this region. At the end of region II is an inflection point A in the curve. Inflection point A represents a transition from region II to region III and is noted by a point where the slope of the curve changes from a decreasing rate to an increasing rate.

Region III is the region in which the battery voltage increases quite rapidly. As the battery reaches its fully charged condition, the internal pressure and temperature of the battery also increase substantially. When these effects begin to take over, the increase in battery voltage begins to taper off. This is noted as the inflection point B.

Region IV represents the fully charged region between inflection point B and the peak of the curve represented by point C. The voltage only stabilizes at point C for a short period of time. If charging continues, the additional heating within the battery will cause the voltage of the battery to decrease and, in addition, may damage the battery.

By analyzing the inflection points of the voltage-time curve, it can be determined at what point the battery has reached maximum charge. This is done by first determining inflection point A and then looking for inflection point B. Once inflection point B is observed, the charging process can be discontinued. Since it is possible to determine the inflection points very readily and accurately, it is possible to halt the charging process, or maintain the charging process at a maintenance charge, following detection of the second inflection point.

Although providing an effective and reliable method of preventing overcharging in a quick charger, the Saar et al, patents suffer the drawback that different battery packs having different rated voltage outputs cannot be charged with the same charging apparatus. What is needed then is an inflection point type quick charging device adaptable to different types of batteries having a relatively wide range of rated voltages. It is therefore an object of the present invention to incorporate the inflection point charging technique with a means for effectively and efficiently charging batteries at different rated voltage levels.

SUMMARY OF THE INVENTION

Disclosed is an ultra-quick charging device for charging battery packs having a wide range of rated voltages. A logarithmic analog-to-digital converter is used to convert the analog battery voltage signal to a digital signal to be processed by a microcomputer. Typically, the range of rated voltages of battery packs used in different power tools and the like varies between approximately 2.4 volts and approximately 13.2 volts. However, the actual voltage exhibited by different battery packs can vary, under certain circumstances, from less than 2 volts to more than 20 volts. Accordingly, to provide adequate charge curve analysis resolution for all rated voltages within this range, which could not heretofore be achieved except at great expense, the present invention uses a logarithmic analog-to-digital converter having means for automatically scaling the battery voltage signal to within a specific range, regardless of the rated output voltage of the battery pack. To accomplish this, the analog-to-digital converter incorporates a prescaler circuit comprising a variable voltage divider circuit that is selectably settable by the microcomputer via a plurality of analog switching devices. In particular, it has been observed that the fully charged voltage level of a chargeable battery will not exceed 150% of its observed voltage after an initial settling period following commencement of the charge cycle. In other words, with reference to FIG. 1, the fully charged battery voltage observed in region IV between inflection point B and peak voltage point C will not exceed 150% of the observed battery voltage at the beginning of Region II. Consequently, since a 5-volts reference voltage is used in the analog-to-digital converter, it is desirable to attenuate the battery voltage signal supplied to the analog-to-digital converter to a value as close to but not greater than 3.3 volts after the settling period (3.3 volts being equal to (1/150%) or 66% of 5 volts). Accordingly, regardless of the rated output voltage of the particular battery pack being charged, full charge will not exceed 5 volts.

At the beginning of a charging sequence, the battery voltage is applied to the analog-to-digital converter with the attenuation of the voltage divider circuit at its highest level. After an initial settling period in which high current is applied to the battery pack for approximately 30 seconds to take the battery voltage out of region I as discussed above, a capacitor of an RC timing circuit, which has been charged to 5 volts, is discharged. Both the attenuated battery voltage and the output of the capacitor are applied to plus and minus terminals of a comparator, respectively. The output from the comparator is provided to the microcomputer which increments a counter to time the period between when the capacitor begins its discharge to the point in time when the charge level on the capacitor drops just below the attenuated battery voltage, which causes the output of the comparator to change states. Since the discharge rate of the capacitor and the clock rate of the counter are known, the microcomputer can equate the number of accumulated counts in the counter with a particular voltage value. Accordingly, after the settling period, the microcomputer is programmed to set the analog switches to an appropriate configuration such that the attenuated battery voltage signal at that time as applied to the comparator is as close to but not greater than 3.3 volts. Once the attenuation level of the voltage divider circuit is set, it is kept constant throughout the charging sequence of the battery.

With the prescaler circuit set, the charging circuit continues to apply a high current charge to the battery pack. As the battery is continuously charged, the microcomputer monitors the voltage level of the battery via the logarithmic analog-to-digital converter. It is therefore possible to correlate the inflection points with the battery voltage to accurately detect at what point along a charging curve the battery voltage is at in order to accurately terminate the charging when it reaches maximum charge. In particular, by discharging the capacitor in an RC timing network having a known discharge rate, and timing the period until the capacitor discharges to the attenuated battery voltage signal, the microcomputer can calculate the value of the battery voltage signal.

Additional objects, advantages, and features of the present invention will become apparent from the following description and appended claims, taken in conjunction with the accompanying drawings.

BRIEF DESCRIPTION OF THE DRAWINGS

FIG. 3 is a schematic diagram of the logarithmic analog-to-digital converter according to a preferred embodiment of the present invention; and FIG. 4 is a graph illustrating the logarithmic relationship between battery voltage and time (i.e., counts)

achieved by the analog-to-digital converter circuit shown in FIG. 3.

DETAILED DESCRIPTION OF THE INVENTION

The following description of the preferred embodiment is merely exemplary in nature and is in no way intended to limit the invention or its applications or uses.

To produce a fast charge on a battery pack it is necessary to apply substantially high current to the battery pack until the battery pack reaches full voltage. In the preferred commercial embodiment, it is desired to fully charge an 11-cell Ni-Cad battery pack within approximately 15 minutes. Consequently, a 6 ampere charging current is required. Because of this high current it is necessary to effectively monitor the charging sequence to prevent prolonged charging beyond full charge which could result in damage or failure of the battery by reducing the overall number of times the battery pack can be charged. Further, it is desirable to apply a maintenance or trickle charge to the battery pack when the battery pack is fully charged. Many different charging schemes are known in the art for applying the high current and maintenance charges from an AC outlet in a desirable fashion. The charging system used in the preferred embodiment is shown in block diagram form in FIG. 2.

Figure 2:
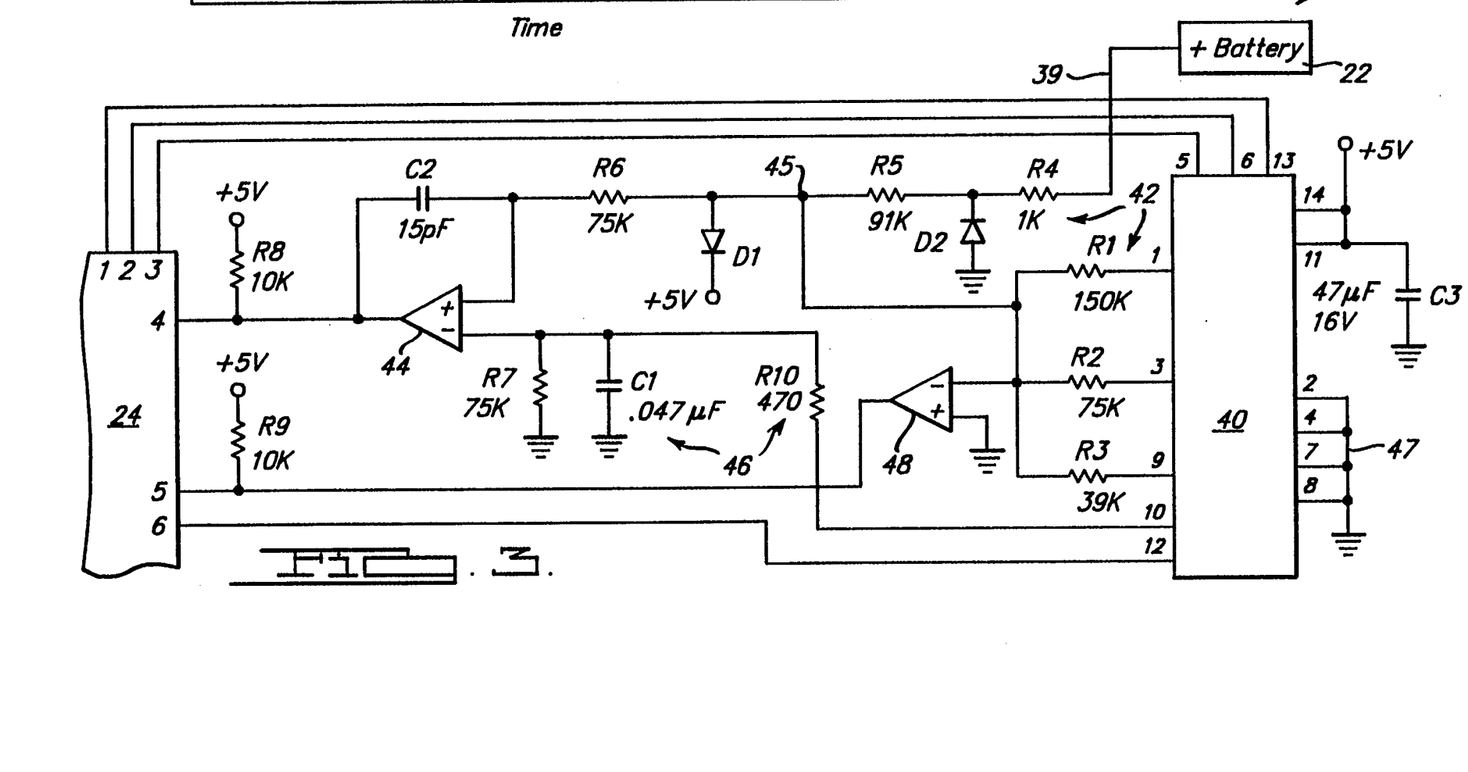
FIG. 2 is a block schematic diagram showing the major operation and control circuitry of a battery charging system according to a preferred embodiment of the present invention.

Turning to FIG. 2, a half bridge type power supply circuit 10 is shown in a block circuit diagram. Circuit 10 includes a high voltage input circuit 12, a low voltage power supply circuit 14 for supplying a low voltage supply to other portions of circuit 10, a pulse width modulation oscillator circuit 16 for generating a high frequency output to be used as a control input 17 for the high voltage circuit 12, a constant current supply circuit 18 for providing a constant current supply to a battery or battery pack 22 to be charged, and a charge current monitoring circuit 20 for monitoring the charge current rate of battery pack 22 and providing a feedback signal to the pulse width modulation circuit 16 to vary accordingly the control signal 17 provided to the high voltage circuit 12. A microcomputer 24 is incorporated for controlling the charging scheme. Other components of circuit 10 include a temperature check circuit 26 which monitors the temperature of battery pack 22 and a digital display circuit 30 to indicate to the operator various parameters of the charging process. A logarithmic analog-to-digital converter 28, according to a preferred embodiment of the present invention, converts the analog battery voltage signal from the battery pack 22 to a digital signal suitable for processing by the microcomputer 24. High voltage circuit 12 receives a 120-volt alternating current (AC) generally from a standard outlet. The AC input signal is rectified and filtered to produce a smooth DC voltage of approximately 150 volts. The AC input signal is also applied, through a transformer, to low voltage supply circuit 14 along line 13. Low voltage supply circuit 14 rectifies the AC signal and applies it to voltage regulator circuits to provide regulated 15-volt and 5-volt outputs for the other circuit components. The various 5-volt and 15-volt supply lines to the other circuit components of the system have been omitted for clarity.

Pulse width modulator (PWM) oscillator circuit 16 receives the 15-volt signal from supply circuit 14 along line 15 and provides a pulsed frequency signal, generally in the form of a square wave, along line 17 to high voltage circuit 12. The square wave signal from oscillator circuit 16 is provided through a coupling transformer to a pair of power switching transistors which, via conventional phase control techniques, regulate the amount of current supplied to the primary coil of the main step down transformer each half cycle of the AC waveform. The step down transformer converts the high voltage signal on its primary to a low voltage, high current signal at its secondary and applies this signal to constant current supply circuit 18 along line 19. The duty cycle of the pulse width modulator signal from oscillator circuit 16 thus controls the level of charging current applied to the battery pack 22. The pulse width modulation approach minimizes the size of the step down transformer required to provide the necessary high current to current supply circuit 18. PWM oscillator circuit 16 also includes a soft start circuit for gradually ramping up the duty cycle of the pulse width modulator oscillator circuit 16 when the charging sequence is initiated.

When microcomputer 24 initiates a charging sequence by applying a signal on line 23 to current supply circuit 18, charge current is supplied to battery pack 22 through low voltage constant current supply circuit 18 along line 21. Current supply circuit 18 preferably includes a reverse polarity detection circuit which protects the circuit 10 from damage in the event the battery pack 22 is inserted backwards. The battery current is sensed along line 25 by a charge current monitoring circuit 20. If the charge current varies from a predetermined level, charge current monitoring circuit 20 will provide an output on line 27 to PWM oscillator circuit 16. PWM Oscillator circuit 16 will then alter the duty cycle of the square wave signal to high voltage circuit 12 in order to alter the charge current appropriately. Likewise, at the end of the high current charging sequence, microcomputer 24 produces an output signal on charge/trickle line 29 to switch to a trickle charge mode.

Temperature check circuit 26 provides a circuit for monitoring battery temperature. Dotted line 31 from temperature check circuit 26 represents a heat sensing device, such as a thermistor, that is physically located adjacent the position of the battery pack when plugged into the charger to sense the temperature of the battery. Temperature check circuit 26 determines when the battery temperature exceeds a predetermined threshold value and in such event sends a signal along line 33 to microcomputer 24. Microcomputer 24 then sends a signal on line 23 to halt charging.

In order to enable the microcomputer 24 to monitor the charging sequence to determine the inflection points in the charging curve of FIG. 1, it is necessary to convert the analog battery voltage signal to a digital signal. Therefore, an analog-to-digital converter must be incorporated. Analog-to-digital converter 28 receives the analog battery voltage on line 39 and produces a timing signal on line 37 which the microcomputer 24, uses to determine the battery voltage value in the manner to be discussed below.

The battery charger according to a preferred embodiment of the present invention has the capability of charging different battery packs having different voltage ratings. Specifically, in a commercial embodiment, the charger is adaptable to charge battery packs rated anywhere from approximately 2.4 volts to approximately 13.2 volts. Of course, this range can be altered in different designs without departing from the spirit of the invention. Because of this relatively wide range of rated voltages (which translates into an even wider range of actual voltages as described previously), special problems are placed on the analog-to-digital conversion circuitry to enable the microcomputer to accurately monitor the charging sequence. In particular, a conventional analog-to-digital converter which would provide suitable resolution for a 2.4-volt battery pack, becomes prohibitively expensive and complex when the voltage is extended to a 13.2-volt battery pack.

To overcome this problem, a logarithmic analog-to-digital converter circuit, according to a preferred embodiment of the present invention, is provided which includes means for automatically scaling the analog battery voltage signal so that, regardless of the rated voltage of the battery pack to be charged, the analog-to-digital converter circuit produces a digital output signal within a specific voltage range. This is accomplished by incorporating an RC timing network and charging the capacitor of the network to a fixed level, then monitoring the time it takes for the capacitor to discharge to a level just below the scaled analog battery voltage signal. In order to properly scale the analog battery voltage signal, a selectively settable resistor ladder network is provided whose attenuation level is controlled by a series of analog switches which are in turn set in accordance with control signals from the microcomputer 24.

As will be recalled from the discussion of FIG. 1, the charging sequence includes an initial settling period of approximately 30 seconds at the beginning of the fast charge cycle during which time the voltage of the battery is allowed to stabilize. Once this initial settling period has elapsed, the battery pack will have a voltage output level greater than or equal to 66% of its maximum voltage generated during the charge cycle, regardless of its particular rated voltage. In other words, for a battery pack having an observed battery voltage after the 30-second settling period of approximately 2 volts, the fully charged voltage of the battery pack will not exceed 3 volts. Similarly, for a battery pack having an observed battery voltage after the 30-second settling period of approximately 12 volts, the fully charged voltage of the battery pack will not exceed 18 volts. The microcomputer 24 is therefore programmed to set the attenuation level of the scaling network so that the battery voltage signal is as close to, but not greater than, 3.3 volts (66% of 5 volts) after the initial 30-second settling period has elapsed. Thereafter, the attenuation setting remains constant during the remainder of the charging sequence. The attenuated battery voltage signal is then provided to the logarithmic analog-to-digital converter which times the period required for a capacitor to discharge from a charge level of 5 volts to a level just below the attenuated battery voltage signal. The resulting time period is therefore proportional to $$\ln\left(\frac{nV_{BATT}}{V_{REF}}\right),$$

where "n" is the scaling factor of the attenuation circuit and $V_{REF}$ is equal to 5 volts.

Referring to FIG. 3, a detailed circuit diagram of the logarithmic analog-to-digital circuit 28 according to the present invention is shown. Analog-to-digital converter 28 includes an input on line 39 from the battery pack 22 being charged. This input is attenuated by a resistor ladder network 42 comprised of resistors R1, R2, R3, R4, and R5. Series resistors R4 and R5 comprise the top half of the voltage divider network 42 and parallel resistors R1–R3 comprise the bottom half of the voltage divider network 42. The attenuated battery voltage signal is therefore produced at the midpoint of the voltage divider network at node 45. Typically, the value of R1 is approximately equal to four times the value of resistor R3 and twice the value of resistor R2. The resulting attenuation level of the resistor ladder network 42 is determined in accordance with the setting of a plurality of analog switching devices which are connected between resistors R1–R3 and ground 47. In the preferred embodiment the analog switching devices are packaged in a single integrated circuit 40. Analog switching device 40 receives three (3) inputs at pins 5, 6, and 13 from microcomputer 24 output pins 1, 2, and 3, respectively. Each one of these inputs controls the setting of one of the analog switches within IC 40. With the values of resistors R1–R3 binary weighted, $2^3$ or eight different attenuation levels are provided. Of course, more or less resistors can be incorporated to vary the resolution of the system. However, as will subsequently be explained in greater detail, due to the use of the logarithmic analog-to-digital converter, more precise resolution of the scaling network is not required.

The attenuated battery voltage signal off node 45 is applied through resistor R6 to the positive input terminal of a comparator 44. The negative input of comparator 44 is connected to an RC timing network 46 as shown. RC network 46 includes a capacitor C1 and resistors R7 and R10. The RC network 46 receives its charge or discharge command from pin 6 of microcomputer 24. An analog switch within IC device 40 controls output pin 10 which determines whether capacitor C1 will charge through resistor R10 or discharge through resistor R7.

Normally, output pin 10 from IC 40 is HI and consequently the capacitor C1 is charged rapidly to 5 volts through resistor R10 which has a relatively low resistance value. When the microcomputer 24 desires to take a battery voltage reading, a control signal is provided on output pin 6 to IC 40 which causes the output from pin 10 of IC 40 to go to a high impedance. This initiates the discharging of capacitor C1 through resistor R7. Simultaneously, the microcomputer 24 begins incrementing an internal counter at a known clock frequency to time the discharge of the capacitor C1. When the capacitor C1 discharges to a level just below the battery voltage signal provided to the positive input of comparator 44, the output of comparator 44 goes HI, providing a signal to pin 4 of microcomputer 24 which terminates the counting period. The resulting count total is therefore proportional to $$\ln\left(\frac{nV_{BATT}}{5\text{ volts}}\right),$$

where "n" is equal to the scaling factor of the attenuation network.

At the outset, after the initial 30-second settling period, the microcomputer 24 sets the appropriate attenuation level of the voltage divider network 42 by causing the output of comparator 44 to go HI when the count total in its internal counter corresponds to a voltage as to close to but not greater than 3.3 volts (i.e. 66% of 5 volts). In the preferred embodiment, this is accomplished in the following manner. Since the discharge time constant of the RC network 46 is known, and the clock rate of the microcomputer's counter is known, a predetermined relationship exists between the number of accumulated counts and the discharge level of capacitor C1. Accordingly, a predetermined number of counts corresponds to an attenuated battery voltage of 3.3 volts, since the output of the comparator 44 will go HI when the charge on capacitor C1 drops just below the attenuated battery voltage signal. Consequently, the microcomputer 24 is programmed, after the initial 30-second settling period, to take successive battery voltage readings at progressively lower attenuation levels, starting with the highest attenuation setting, until a voltage reading as close to, but not greater than, 3.3 volts is observed. In other words, with the analog switches 40 set to provide the maximum attenuation of the battery voltage signal on line 39, the microcomputer 24 initiates the discharge of capacitor C1 and counts the period until the output of comparator 44 goes HI. If the resulting count total corresponds to a voltage value less than 3.3 volts, the process is repeated at the next lowest attenuation level by adjusting accordingly the setting of analog switches 40. The microcomputer 24 is programmed to repeat this process at progressively lower attenuation levels until the observed attenuated battery voltage signal is as close to but not greater than 3.3 volts. In the event the battery being charged is a small two-cell pack, for example, which may not attain 3.3 volts even when fully charged, the microcomputer 24 is programmed to set the analog switches 40 to the lowest attenuation setting, which in the preferred embodiment corresponds to a scaling factor of one. This resulting setting of the analog switch device 40 by the microcomputer 24 is thereafter maintained constant for the duration of the charging process.

Now it is possible for the computer 24 to monitor the battery voltage over the entire charging sequence, regardless of the rated voltage of the battery. As the battery is charged, the attenuated voltage signal applied to the positive terminal of comparator 44 will accordingly increase between 3.3, volts and 5 volts (except for the smallest battery packs which will typically vary between 2 and 3 volts). Therefore, whenever the microcomputer 24 wishes to take a voltage reading of battery pack 22, it discharges the capacitor C1 as described above and waits until the charge on capacitor C1 dissipates to a level just below the level of the attenuated battery voltage signal. As the capacitor C1 is discharging microcomputer 24 is counting. When the capacitor C1 voltage falls just below the attenuated battery voltage, comparator 44 outputs a HI signal to pin 4 of microcomputer 24 as discussed above. The microcomputer 24 then correlates the resulting total count to a particular voltage value.

The significance of the logarithmic analog-to-digital converter to the present invention will now be explained. The present charger system is adapted as noted to charge a variety of different chargeable battery packs having a range of different rated voltages. However, even though the voltage of a large battery pack will vary over a substantially greater range than that of a small battery pack, the percentage increase in voltage for both battery packs during the charging process will be substantially the same. In other words, the percentage increase in voltage observed during the charging process for a two-cell battery pack is substantially equal to that for an eleven-cell battery pack. Accordingly, it is desirable to provide an analog-to-digital converter that functions on a percentage basis so that the same degree of resolution is provided for both small and large battery packs.

Figure 4:
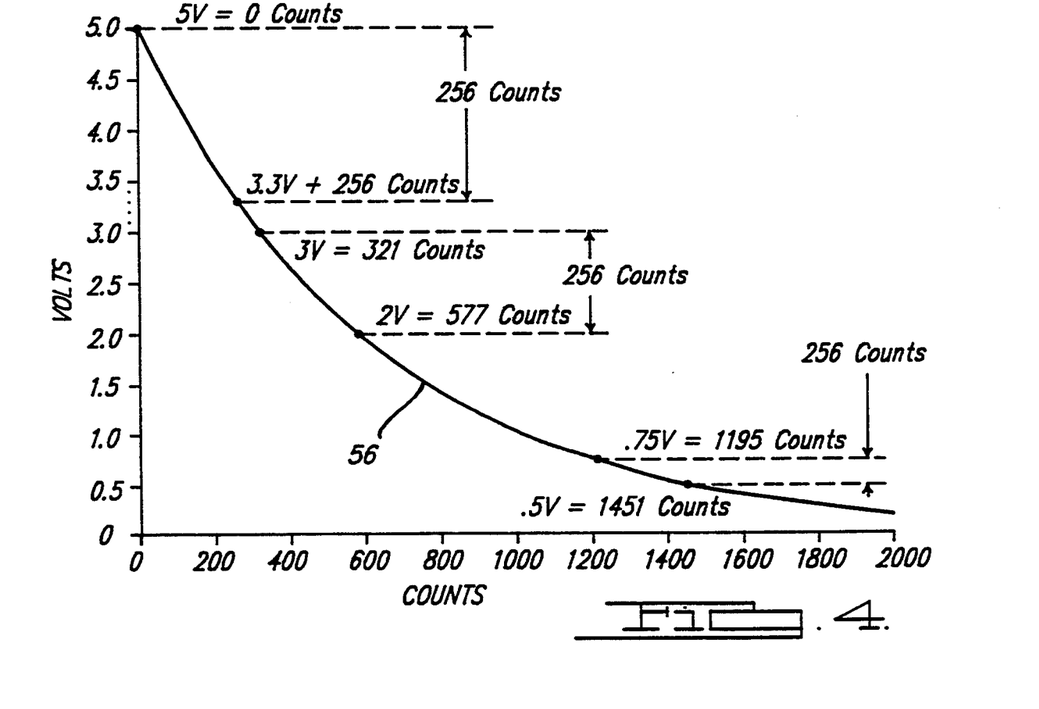

This desired relationship is illustrated in FIG. 4 which shows a curve 56 that defines a uniform resolution, or count differential, for a given percentage change in voltage. In particular, it will be noted that the same 256 count differential exists between 3.3 volts and 5 volts, 2 volts and 3 volts, and 0.5 volt and 0.75 volt. Yet, each of these voltage ranges represents the same 150% increase in battery voltage. As will be readily appreciated by those skilled in the art, the resulting curve 56 shown in FIG. 4 defines a logarithmic mathematical relationship between analog voltage and digital counts. Moreover, it will further be appreciated that the discharge curve of a capacitor in a simple RC timing network closely approximates the curve 56 illustrated in FIG. 4. Accordingly, by using the discharge curve of the capacitor C1 to correlate the analog battery voltage signal to a digital count total, a logarithmic analog-to-digital converter is obtained. Consequently, regardless of the precise voltage range over which the battery pack varies during the charging process, the logarithmic analog-to-digital converter used in the present invention provides the same degree of resolution.

In the preferred embodiment, the count frequency used by the microcomputer to time the discharge of capacitor C1 is selected to provide 256 counts within the time required for the capacitor to discharge from 5 volts to 3.3 volts. Consequently, an 8-bit counter can be used since, as previously noted, the voltage of a battery pack will increase no more than 150% during the charging process.

At this point, it is important to understand the purpose of the prescaling network in the present analog-to-digital converter 28. While it is theoretically possible to simply use a logarithmic analog-to-digital converter having a reference voltage of 24 volts, for example, to accommodate all possible battery voltage levels, the resulting response time of the conversion process would diminish substantially. In addition, it is desirable to limit the analog-to-digital converter 28 to the upper portion of the discharge curve (shown in FIG. 4) as this is the portion where the system is the most accurate and hence where a logarithmic analog-to-digital converter performs best.

Accordingly, the function of the prescaler circuit in the battery charger of the present invention is primarily two-fold: first, to reduce the battery voltage range to a reasonable level to maintain an acceptable response time for the analog-to-digital conversion process; and second, to limit as much as possible the battery voltage signal to the upper portion of the curve where the logarithmic analog-to-digital converter is the most accurate.

Returning to FIGS. 1 and 2, the microcomputer 24 in the preferred embodiment is programmed to monitor the voltage of the battery pack 22 and terminate the high current charge phase and convert to a trickle charge mode upon the detection of the second inflection point "B" in the battery voltage curve. In addition, as taught by the aforementioned Saar et al. U.S. Pat. Nos. 4,388,582 and 4,392,101, it is desirable to provide alternative charge termination criteria, such as the detection of an absolute drop in battery voltage, or the elapse of a maximum period of time. Also, as previously noted, the microcomputer 24 is further programmed to terminate charging of the battery 22 in the event the temperature of the battery 22, as detected by the temperature check circuit 26, exceeds a predetermined maximum level.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A method of charging a battery selected from a group of batteries having a range of substantially different battery voltage ratings, including at least a first range and a second range, substantially greater than said first range comprising:

applying a charging current to said battery:

monitoring the voltage of said battery by sampling at discrete time intervals to obtain a plurality of instantaneous voltage readings:

converting said instantaneous voltage readings into corresponding digital values so that a given percentage difference in voltage readings within either of said first or second ranges is represented by substantially the same difference in said corresponding digital values;

using at least one of said digital values as a control parameter to determine when to terminate the applying of charging current to said battery.

2. The method of claim 1 wherein said converting step is performed by generating an exponentially nonlinear time varying signal, comparing an instantaneous voltage reading with said time varying signal, measuring a time elapsed from a starting time until said time varying signal and said voltage readings bear a predefined relationship to one another, and using said measured time to generate a digital value corresponding to the instantaneous voltage.

3. The method of claim 2 wherein said nonlinear time varying signal is a logarithmically decaying time varying signal.

4. The method of claim 1 wherein said converting step is performed by charging an energy storage device to a predetermined starting voltage; at a first time, discharging the energy storage device at a controlled rate; while discharging the energy storage device comparing an instantaneous voltage reading with the voltage of said energy storage device; determining a second time when said instantaneous voltage reading and the voltage of said energy storage device bear a predetermined relationship to one another; using said first time and said second time to determine an elapsed time; using said elapsed time to generate a digital value corresponding to the instantaneous voltage.

5. The method of claim 2 wherein said elapsed time is determined by generating a plurality of temporally spaced clock pulses and by counting the number of clock pulses between said first time and said second time.

6. The method of claim 2 wherein said digital value is determined by generating a plurality of temporally spaced clock pulses, by counting the number of clock pulses between said first time and said second time and by using said counted number to represent said digital value.

7. The method of claim 1 further comprising using a plurality of said digital values to determine a rate of change in battery voltage as charging current is applied and by terminating the applying of charging current to said battery when the rate of change in battery voltage changes sign.

8. A method of charging a battery selected from a group of batteries having rated voltages between a first rated voltage and a second substantially greater rated voltage, comprising:

applying a charging current to the battery;

monitoring the voltage of the battery at discrete time intervals to obtain a plurality of instantaneous battery voltage samples within a range of voltage values related to the rated voltage of the battery such that a battery having said first rated voltage produces battery voltage samples while charging within a first range of voltage values and a battery having said second rated voltage produces battery voltage samples while charging within a second substantially greater range of voltage values;

converting said instantaneous battery voltage samples to corresponding digital values so that a given percentage difference in voltage values within either said first or said second ranges of values is represented by substantially the same difference in said corresponding digital values; and terminating the application of charging current to a battery having said first rated voltage by detecting predetermined incremental changes in the voltage of the battery of a magnitude that are too small to be detectible when charging a battery having said second rated voltage.

9. A method of charging a battery selected from a group of batteries having a range of different battery voltage ratings, comprising:

applying a charging current to said battery:

monitoring the voltage of said battery by sampling at discrete time intervals to obtain a plurality of instantaneous voltage readings:

converting said instantaneous voltage readings into digital values;

applying a nonlinear factor to the digital values such that a given percentage change in voltage within said range of different battery voltage ratings is represented by substantially the same change in digital values;

using a plurality of said scaled digital values to determine a rate of change in battery voltage as charging current is applied;

terminating charging current when the rate of change in battery voltage changes sign.

10. A battery charger for charging a battery selected from a group of batteries having a range of different battery voltage ratings including a first range and a second range, comprising:

a current source for supplying charging current to said battery;

a battery voltage sensor for sampling the voltage of the battery being charged and for supplying a corresponding digital signal indicative of the sampled battery voltage;

a controller circuit coupled to said current source and to said battery voltage sensor for terminating the supplying of charging current in response to a predetermined battery voltage condition and based on said digital signal;

said battery voltage sensor having apparatus for automatically converting battery voltages within said first range into digital signals at a first resolution and for automatically converting battery voltages within said second range into digital signals at a second resolution;

whereby termination of the supplying of charging current is effected based on voltage readings taken at a resolution automatically determined by the voltage range of the particular battery being charged.

11. The battery charger of claim 10 wherein said apparatus comprises analog means for applying a non-linear factor to said digital signal.

12. The battery charger of claim 10 wherein said apparatus includes energy storage means and means for discharging said storage means at a controlled rate to generate a decaying reference signal, a means for comparing said sampled battery voltage to said reference signal and a means for producing said digital signal in response to said comparison.

13. The apparatus of claim 10 wherein said first range includes voltages in the range of about 0.5 to 0.75 volts and said second range includes voltages in the range of about 2 to 3 volts.

14. The apparatus of claim 10 wherein said first range includes voltages in the range of about 0.5 to 0.75 volts and said second range includes voltages in the range of about 3.3 to 5 volts.

15. The apparatus of claim 10 wherein said first range includes voltages in the range of about 0.5 to 0.75 volts and said second range includes a voltage of about 13.2 volts.

16. The apparatus of claim 10 wherein said first range includes voltages in the range of about 0.5 to 0.75 volts and said second range includes a voltages of about 20 volts.

17. The apparatus of claim 10 wherein said first range includes a voltage of about 2 volts and said second range includes a voltage of about 20 volts.

18. The apparatus of claim 10 wherein said first range includes a voltage of about 2.4 volts and said second range includes a voltage of about 13.2 volts.

* * * * *

UNITED STATES PATENT AND TRADEMARK OFFICE
CERTIFICATE OF CORRECTION

PATENT NO. : 5,449,997
DATED : September 12, 1995
INVENTOR(S) : Alan A. Gilmore et al.

It is certified that error appears in the above-indentified patent and that said Letters Patent is hereby corrected as shown below:

Column 11, line 56, claim 5, "2" should be --3--.

Column 11, line 61, claim 6, "2" should be --3--.

Signed and Sealed this

Second Day of April, 1996

Attest:

BRUCE LEHMAN

Attesting Officer

Commissioner of Patents and Trademarks